US009253182B1

(12) United States Patent
Veen

(10) Patent No.: US 9,253,182 B1
(45) Date of Patent: Feb. 2, 2016

(54) WEB DOCUMENT TRANSFERS

(71) Applicant: Amazon Technologies, Inc., Reno, NV (US)

(72) Inventor: Jaskirat Singh Veen, Coimbatore (IN)

(73) Assignee: Amazon Technologies, Inc., Reno, NV (US)

( * ) Notice: Subject to any disclaimer, the term of this patent is extended or adjusted under 35 U.S.C. 154(b) by 0 days.

(21) Appl. No.: 14/468,190

(22) Filed: Aug. 25, 2014

Related U.S. Application Data

(63) Continuation of application No. 13/109,699, filed on May 17, 2011, now Pat. No. 8,819,123.

(51) Int. Cl.
*H04L 29/06* (2006.01)
*G06F 3/0481* (2013.01)
*H04L 29/08* (2006.01)

(52) U.S. Cl.
CPC .............. *H04L 63/08* (2013.01); *G06F 3/0481* (2013.01); *H04L 65/4084* (2013.01); *H04L 65/601* (2013.01); *H04L 67/10* (2013.01)

(58) Field of Classification Search
None
See application file for complete search history.

(56) References Cited

U.S. PATENT DOCUMENTS

| 2002/0002592 | A1* | 1/2002 | Aoki et al. ................... | 709/211 |
| 2005/0034057 | A1 | 2/2005 | Hull et al. | |
| 2008/0086307 | A1 | 4/2008 | Okayama et al. | |
| 2008/0201751 | A1* | 8/2008 | Ahmed et al. ................ | 725/109 |
| 2008/0313294 | A1 | 12/2008 | Malone et al. | |
| 2010/0031299 | A1 | 2/2010 | Harrang et al. | |
| 2010/0217703 | A1 | 8/2010 | Herz et al. | |
| 2011/0178987 | A1 | 7/2011 | Choi | |
| 2011/0289187 | A1 | 11/2011 | Brodin et al. | |
| 2011/0321133 | A1* | 12/2011 | Grieve ............................ | 726/4 |

OTHER PUBLICATIONS

USPTO Notice of Allowance mailed May 2, 2014 for U.S. Appl. No. 13/109,699.
USPTO Non-final Office Action mailed Nov. 4, 2013 for U.S. Appl. No. 13/109,699.
USPTO Final Office Action mailed Jul. 11, 2013 for U.S. Appl. No. 13/109,699.
USPTO Non-final Office Action mailed Feb. 6, 2013 for U.S. Appl. No. 13/109,699.

* cited by examiner

*Primary Examiner* — Michael Thier
*Assistant Examiner* — Eric Myers
(74) *Attorney, Agent, or Firm* — Lowenstein Sandler LLP

(57) ABSTRACT

Methods and systems for enabling transfer of digital content of a webpage to a user device for subsequent consumption by the user device are described. A client computing system receives user input indicating selection of a graphical user interface (GUI) element while presenting a webpage in a browser of the client computing system. The client computing system sends an unauthenticated request to transfer the digital content of the webpage presented in the browser and prompts a user of the browser to login to an account in response to the unauthenticated request. The client computing system sends an authentication request with login information to authenticate the user to automatically authorize operations to transfer the digital content. The client computing system sends an authenticated transfer request to a server computing system to transfer the digital content presented in the browser to the user device for the subsequent consumption by the user device.

20 Claims, 6 Drawing Sheets

WEB DOCUMENT TRANSFERS

RELATED APPLICATIONS

This application is a continuation of U.S. patent application Ser. No. 13/109,699, filed May 17, 2011, the entire contents of which are incorporated herein by reference.

BACKGROUND

A large and growing population of users is enjoying entertainment through the consumption of digital media items, such as music, movies, images, electronic books, and so on. The users employ various electronic devices to consume such media items. Among these electronic devices (referred to herein as user device) are electronic book readers, cellular telephones, personal digital assistants (PDAs), portable media players, tablet computers, netbooks, laptops, and the like. These electronic devices wirelessly communicate with a communications infrastructure to enable the consumption of the digital media items.

It is not uncommon for a user while visiting website on the Internet comes across web documents (e.g., webpages, pdf documents, articles, text documents, word processing documents, blog entries, etc.) that the user wants to send to another computing device, such as the electronic devices described above for subsequent viewing on the other device. The user may wish to read or view the web document on the other device because the user may prefer to view or read the web document on a portable device, or a device that is dedicated to long form reading, such as an electronic book reader. This may provide convenience and portability to the user for reading web documents on other devices. For example, a user may find an article on the web while at work, and may want to read the article on a different device, such as an electronic book reader, at home or while in transit.

Currently, in order to achieve transfers of web documents to these electronic devices, a user performs various manual, tedious steps. For example, to send a webpage to an electronic book reader, the user saves the webpage to disk of the computer on which the user is viewing the webpage (i.e., computer running a web browser). The user then has to convert the saved file into a native format of the user device and deliver the converted file to the user device, such as using a Universal Serial Bus (USB) storage drive, a USB cable, or the like.

BRIEF DESCRIPTION OF THE DRAWINGS

The present invention will be understood more fully from the detailed description given below and from the accompanying drawings of various embodiments of the present invention, which, however, should not be taken to limit the present invention to the specific embodiments, but are for explanation and understanding only.

DETAILED DESCRIPTION

Figure 1:
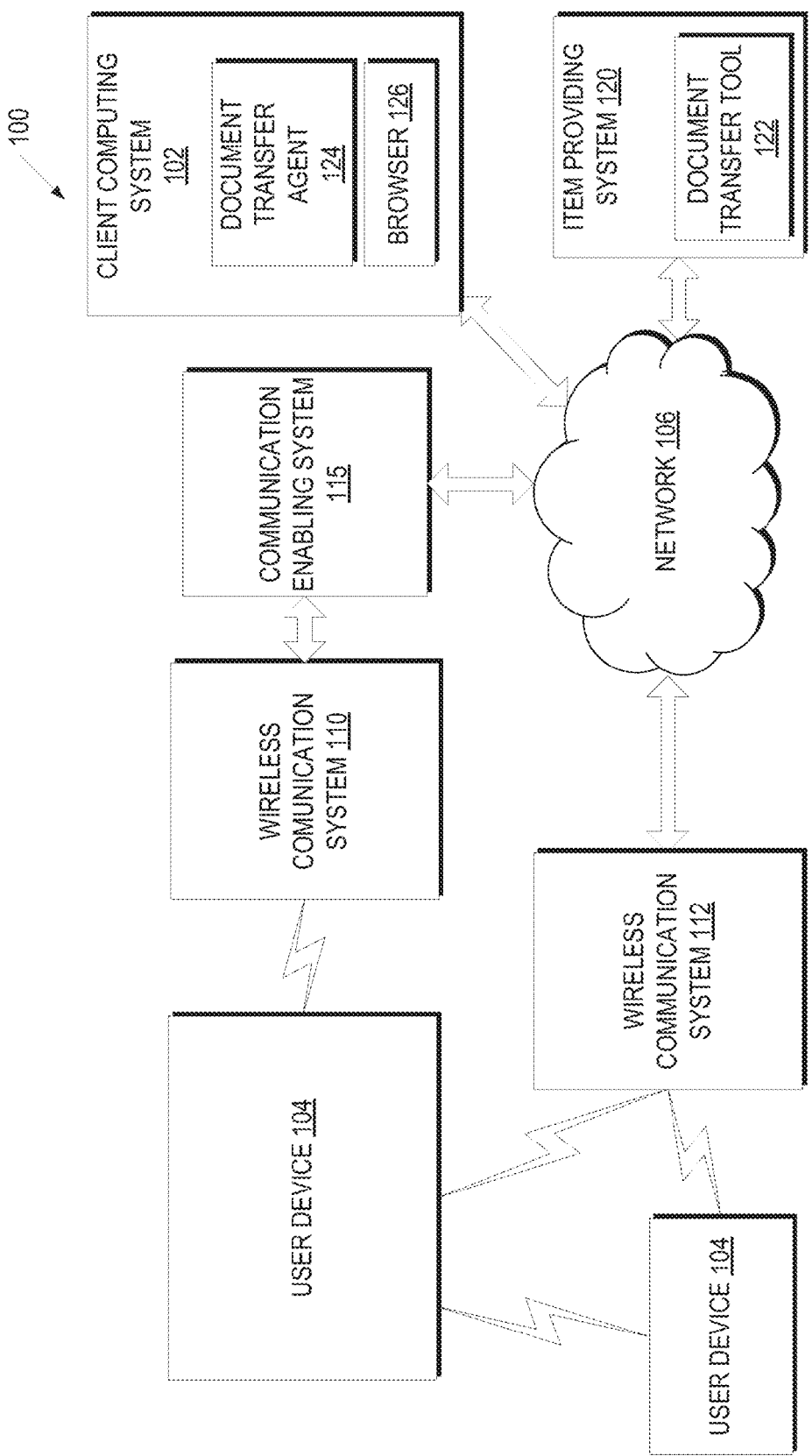
FIG. 1 is a block diagram of an exemplary network architecture in which embodiments of the present invention may operate.

Methods and systems for enabling transfers of web documents to user devices for subsequent viewing on the user devices are described. The user device may be any content rendering device that includes a wireless modem for connecting the user device to a network. Examples of such user devices include electronic book readers, portable digital assistants, mobile phones, laptop computers, portable media players, tablet computers, cameras, video cameras, netbooks, notebooks, desktop computers, gaming consoles, DVD players, media centers, and the like. The user device may connect to a network to obtain content from a server computing system (e.g., an item providing system) or to perform other activities. The user device may connect to one or more different types of cellular networks. In one embodiment, a user on a client computing system views a web document, such as a webpage or an article hosted at a website, and decides to transfer the web document to another device—one of the user devices described above. The user may activate a document transfer agent, such as a browser add-on or a javascript bookmarklet, which generates and sends a request to a server computing system to initiate a document transfer of the web document to the user's user device. The document transfer agent may include an element of a graphical user interface (GUI) of the browser that can be activated by the user, such as by the click of a cursor, or a keyboard shortcut. The server computing system may include a processing device that executes a document transfer tool that receives the request from the browser (i.e., document transfer agent). The document transfer tool receives a uniform resource locator (URL) of the webpage as part of the request. Alternatively, the document transfer agent sends the webpage itself. In the case of receiving the URL, the document transfer tool retrieves the web document using the URL and converts the web document into a format that is compatible with the user device. The document transfer tool sends the converted web document to the user device via a network, such as via a wired or wireless communications network. Alternatively, the server computing system can send the web document to a personal documents service for conversion and delivery of the web document to the user device.

Unlike the conventional approached described above, the embodiments described herein provide a simple automated process for transferring web documents to the user device. For example, the embodiments described herein may enable a user to send a currently open webpage on a browser to the user device in "one-click," enabling users to more effectively send web documents from the Internet or other networks to their user devices for subsequently consumption. The embodiments provide an improved approach to transfer web documents as compared to previous solutions that required manual steps, such as saving the web document to disk, converting it to a native format, and then transferring the converted file using a USB disk drive or USB cable. Unlike the previous solutions, the embodiments described herein can initiate the transfer at the client computing system (e.g., at the browser), and the conversion and delivery of the web document can be performed automatically. That is the user can transfer the web documents without additional user interaction at the client computing system after initiating the transfer.

In some cases where the user device (e.g., electronic book reader) is configured to receive transferred documents via email, the user was required to double zip the web page, attaching the double zip file as an attachment to an email corresponding to the electronic book reader. The double zip operates to compress the HyperText Markup Language (HTML) page with all its images into a single compressed filed (i.e., zip file). The user sends the email to the electronic book reader via a personal documents service. The personal documents service converts and delivers the converted file to the electronic device. In order to deliver the converted file to the electronic device, the sender of the converted document needs to be included in a list of authorized senders. As such, the user of the electronic device would manually login into the personal documents service to add the sender's email address to a list of authorized email addresses (also referred to herein as a whitelist) that can send web documents to the user device before attempting to send any web documents via the personal documents service. Often the personal document service ignores web document transfer requests that are received from email addresses that are not on the list. Some personal document services charge a fee for documents sent to the electronic device over a cellular network, but may provide free delivery for documents sent to the electronic device over a Wi-Fi connection. Thus, in order to transfer web documents conventionally, the user needs to perform these manual steps that are considered complex and difficult for the average user, and prone to human error. Unlike this conventional solution, the embodiments described herein can transfer the web documents to the user device without adding a sender's email address to a list of authorized email addresses that can send web documents to the user device (referred to herein as a whitelist). For example, the document transfer agent or document transfer tool can verify that the user is logged into the service when transferring web documents to the user device, eliminating the need to add the sender's email address to the whitelist. These embodiments may allow users to transfer any publicly accessible web document to their user device at the click of a button, for example.

FIG. 1 is a block diagram of an exemplary network architecture 100 in which embodiments described herein may operate. The network architecture 100 may include an item providing system 120, one or more client computing system 102, and one or more user devices 104 capable of communicating with each other via a network 106 (e.g., public network such as the Internet or private network such as a local area network (LAN)).

The user devices 104 are variously configured with different functionality to enable consumption of one or more types of media items. The media items may be any type of format of digital content, including, for example, electronic texts (e.g., eBooks, electronic magazines, digital newspapers, etc.), digital audio (e.g., music, audible books, etc.), digital video (e.g., movies, television, short clips, etc.), images (e.g., art, photographs, etc.), and multi-media content. The user devices 104 may include any type of content rendering devices such as electronic book readers, portable digital assistants, mobile phones, laptop computers, portable media players, tablet computers, cameras, video cameras, netbooks, notebooks, desktop computers, gaming consoles, DVD players, media centers, and the like.

The item providing system 120 and the user devices 104 deliver and/or receive items, upgrades, and/or other information via the network 106. For example, the user devices 104 may download or receive items from the item providing system 102. The item providing system 120 also receives various requests, instructions and other data from the user devices 104 via the network 106. The item providing system 120 may operate in the capacity of a server computing system in client-server network environment. The item providing system 120 may include one or more machines (e.g., one or more server computers, routers, gateways, etc.) that have processing and storage capabilities to provide the above functionality. The item providing system 120 hosts the document transfer tool 122 described in more detail below.

The client computing system 102 may include one or more machines, and may be any content rendering device that includes a wireless modem for connecting to the network. Examples of such client computing system include desktop computers, laptop computers, tablet computers, and client or server workstations. It should also be noted that the client computing system 102 may also be another user device, including electronic book readers, portable digital assistants, mobile phones, laptop computers, portable media players, tablet computers, cameras, video cameras, netbooks, notebooks, desktop computers, gaming consoles, DVD players, media centers, and the like. For example, in one embodiment, the client computing system 102 is a mobile phone that can access web documents, and the user device 104 is an electronic book reader. The client computing system 102 hosts the document transfer agent 124, as well as executes a browser 126, which are described in more detail below.

Communication between the item providing system 120 and the user device 104 may be enabled via any communication infrastructure. One example of such an infrastructure includes a combination of a wide area network (WAN) and wireless infrastructure, which allows a user to use the user device 104 to purchase items and consume items without being tethered to the item providing system 120 via hardwired links. The wireless infrastructure may be provided by one or multiple wireless communications systems, such as one or more wireless communications system, a wired communication system, or any combination thereof, such as wireless communications system 110 and wireless communication system 112 depicted in FIG. 1. One of the wireless communication systems 110, 112 may be a wireless fidelity (Wi-Fi) hotspot connected with the network 106. Another of the wireless communication systems 110, 112 may be a wireless carrier system that can be implemented using various data processing equipment, communication towers, etc. Alternatively, or in addition, the wireless carrier system may rely on satellite technology to exchange information with the user device 104.

The communication infrastructure may also include a communication-enabling system 115 that serves as an intermediary in passing information between the item providing system 120 and the wireless communication system 110. The communication-enabling system 115 may communicate with the wireless communication system 110 (e.g., a wireless carrier) via a dedicated channel, and may communicate with the item providing system 120 via a non-dedicated communication mechanism, e.g., a public Wide Area Network (WAN) such as the Internet. A cellular network is a radio network distributed over land areas called cells, each served by at least one fixed-location transceiver typically known a base station. When joined together these cells provide radio coverage over a wide geographic area. This enables a large number of portable transceivers of user devices to communicate with each other and with fixed transceivers and telephones anywhere in the network, via base stations, even if some of the transceivers are moving through more than one cell during transmission.

These cells may communicate with the user devices 104 using the same frequency, different frequencies, same communication type (e.g., WCDMA, GSM, LTE, CDMA, WiMax, etc.), or different communication types. Each of the base stations may be connected to network 106 or a public switched telephone network (PSTN), or both, to allow the user devices 104 to communicate with other devices, such as other user devices, server computing systems, telephone devices, or the like. The user device may connect to other types of networks, such as a wireless fidelity (Wi-Fi) network. Similarly, the client computing system 102 may communicate with other devices using a cellular network as described above, a private network, a public network, or any combination thereof.

Figure 2:
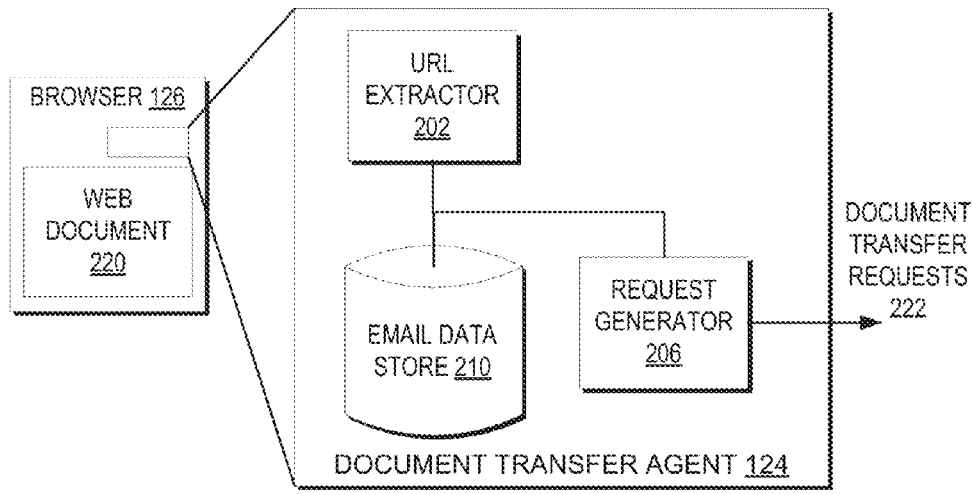
FIG. 2 is a block diagram of one embodiment of a client computing system having a document transfer agent.

FIG. 2 is a block diagram of one embodiment of the client computing system 102 having the document transfer agent 124. The document transfer agent 124 includes a URL extractor 202, a request generator 206, and an email data store 210. In one embodiment, the document transfer agent 124 is a browser add-on or browser plug-in. The browser add-on or browser plug-in may reside as a toolbar in the browser's display, or may be incorporated into the functionality of the browser 126. In another embodiment, the document transfer agent 124 is a javascript bookmarklet. The javascript bookmarklet is a small computer application (also referred to as an applet), stored as the URL of a bookmark in a browser or as a hyperlink on a webpage. Bookmarklets may be designed to add one-click functionality to the browser 126. When clicked, a bookmarklet performs some function. In this case the bookmarklet generates the document transfer request 222 to transfer the web document that is currently open on the browser 126 to the user device. Bookmarklets are typically javascript applications, but may be other types of code, such as a script, a widget or other mechanisms used to interface with the browser 126 to monitor the web documents 220 being viewed on the browser 126 and to transfer the currently open web document 220 to the user device 104. In particular, when the document transfer agent 124 is activated by the user of the browser 126, the document transfer agent 124 generates a document transfer request 222 to transfer the web document 220 to the user device 104 via the document transfer tool 122. The document transfer agent may include an element of a GUI of the browser 126 that can be activated by the user, such as by the click of a cursor, or a keyboard shortcut.

In the depicted embodiment, the document transfer agent 124 includes an email data store 210 that stores the email address corresponding to the user device 104 to which the user wants to send the web document 220. For example, the user can configure the email address to be stored in the email data store 210 when installing the document transfer agent 124, or when first using the document transfer agent 124. The email data store 210 may be part of the browser's data store, and may be stored in one or more storage devices that may be composed of one or more types of removable storage, one or more types of non-removal storage (e.g., read-only memory (ROM), flash memory, dynamic random access memory (DRAM) such as synchronous DRAM (SDRAM), flash memory, static random access memory (SRAM)), or any combination thereof. In another embodiment, the email data store 210 stores other identifying information other than, or in addition to the email address. For example, the email data store 210 stores an identifier for the user. When the document transfer agent 124 is activated, the request generator 206 generates a document transfer request 222 to transfer the web document 220 to the user device 104. In one embodiment, the document transfer agent 124 uses the URL extractor 202 to extract the URL (or uniform resource identifier (URI)) of the web document 220 and sends the URL as part of the request 222. In another embodiment, the request generator 206 sends the webpage in connection with the request 222. The document transfer tool 122 sends the user's email address stored in the email data store 210 in the request 222 or in connection with the request 222. In another embodiment, the request generator 206 sends the user's identifier in the request 222 or in connection with the request 222, and the document transfer tool 122 uses the user's identifier to determine the user's email address corresponding to the user device 104.

Figure 3:
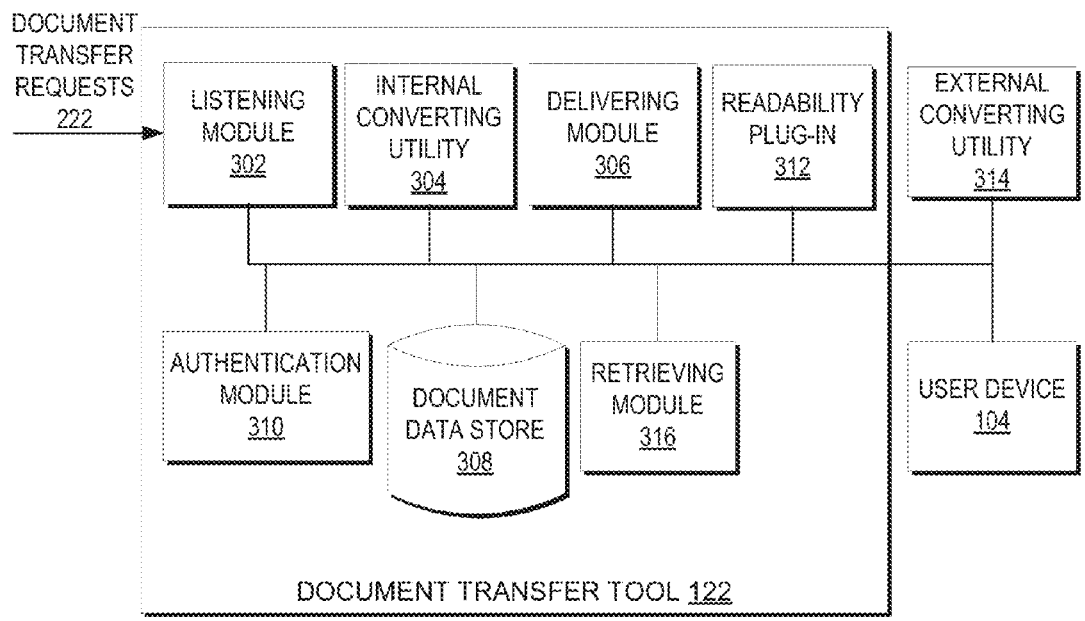
FIG. 3 is a block diagram of one embodiment of a server computing system having a document transfer tool.

FIG. 3 is a block diagram of one embodiment of a server computing system having a document transfer tool 122. The document transfer tool 122 includes a listening module 302, an internal converting utility 304, a delivering module 306, a document data store 308, an authentication module 310, a readability plug-in 312, and a retrieving module 316. The document transfer tool 122 may also use an external converting utility 314 as described below.

The listening module 302 of the document transfer tool 122 monitors for incoming document transfer requests 222 received from the document transfer agents 124 of the client computing devices 102. Once the web document has been obtained by the document transfer tool 122, the document transfer tool 122 may store the web document temporarily in the document data store 308. The document data store 308 may be composed of one or more storage devices associated with a server computing system hosting the document transfer tool 122. In one embodiment, the document transfer tool 122 obtains the web document from the document transfer agent 124. In another embodiment, the document transfer tool 122 obtains the web document using an URL sent from the document transfer agent 124 as described below. The internal converting utility 304 converts a first format type of the web document 220 into a second format type that is compatible with the user device 104. For example, the web document may be an HTML file, and the internal converting utility 304 converts the HTML file into a plain text file. Alternatively, the internal converting utility 304 converts the HTML file into another format, such as, for example, user device formats, including proprietary formats, open eBook package, portable document format (PDF), PostScript, DjVu, EPUB, Fiction-Book, the KINDLE® electronic book reader, eReader, Mobipocket, TealDoc, Broadband eBook, WOLF, Tome Raider, ArghosReader, Multimedia EBook, or Repligo. Alternatively, the web documents 220 may be other types of formats, such as a Microsoft Word document, and the internal converting utility 304 converts the document into one of the other formats, such as a format that is compatible with an electronic book reader. In another embodiment, the document transfer tool 122 uses an external converting utility 314 to perform the conversion of the web document 220. The external converting utility 314 may be a personal documents services (also referred to as pdocs). In one embodiment, the internal or external converting utilities may be KINDLE®Gen, developed by Amazon.com. Alternatively, other types of converting utilities may be used, as well as different types of delivery systems.

In one embodiment, the document transfer tool 122 receives a request 222 with a URL of the web document 220 to be transferred to the user device 104. In this embodiment, the retrieving module 316 retrieves the web document 220 using the URL in the request 222. Once the retrieving module 316 retrieves the web document 220, the retrieving module 316 sends the web document 220 to the internal converting utility 304 or the external converting utility 314 to be converted.

Once the web document 220 is converted, the delivering module 306 sends the converted web document to the user device 104, such as via a network connection over the network 116 as described above.

In another embodiment, the document transfer tool 122 includes a readability plug-in 312. Although labeled as a plug-in, the readability plug-in 312 may also be a JavaScript Favelet or Bookmarklet. The readability plug-in 312 is used to declutter a web document into a simple view of the text (or images) of the web document. For example, the readability plug-in 312 may extract advertisements, images, videos, or other media that is part of the web document when viewed on the website. The readability plug-in 312 may turn a webpage into a comfortable reading view for subsequent viewing on the user device 104. The readability plug-in 312 may strip the superfluous information so that the main content of the web document 220 may be viewed on the user device 104 in a simpler view, such as a in a single column of easy-to-read text. It should be noted that the readability plug-in 312 may declutter the web document 220 before or after being converted by one of the converting utilities.

In another embodiment, the document transfer tool 122 includes an authentication module 310. The authentication module 310 determines if a user of the client computing system is authenticated with the server computing system (e.g., item providing system 120). When the user is not authenticated, the authentication module 310 prompts the user of the client computing system to authenticate with the server computing system. The authentication module 310 enables a user to send the converted content without additional client interaction at the client computing system, as described herein. In one embodiment, the authentication module 310 receives a request 222 to authenticate the user prior to the document transfer tool 122 receiving the request 222 to transfer the web document 220. In another embodiment, the authentication module 310 authenticates the user upon the user's first document transfer request 222 of a session on the browser 126. In another embodiment, the user may be prompted to login into the service, such as upon launch of the browser 126 or upon the user's first use of the document transfer agent 124. In this case, the authentication module 310 may check to see if the user is still logged into the service, eliminating the need to ensure that the sender's email address is whitelisted. In one embodiment, the authentication module 310 prompts the user for login information, and receives the login information from the user via an input field of a dialog or a webpage in the browser 126. The authentication module 310 verifies the login information to authenticate the user. If the user is not authenticated, the authentication module 310 can notify the user and may ignore the document transfer request 222. In another embodiment, the authentication module 310 redirects the browser 126 to a login web page to authenticate the user, returning the user to the webpage being viewed before being prompted for authentication. When the authentication module 310 has already authenticated the user, the document transfer tool 122 can automatically authorize the converting and sending of the web document to the user device 104. The document transfer tool 122 can ignore the request 222 when the user is not authenticated. Ignoring the request 222 may include preventing the converting and the sending of the web document to the user device 104.

Figure 4:
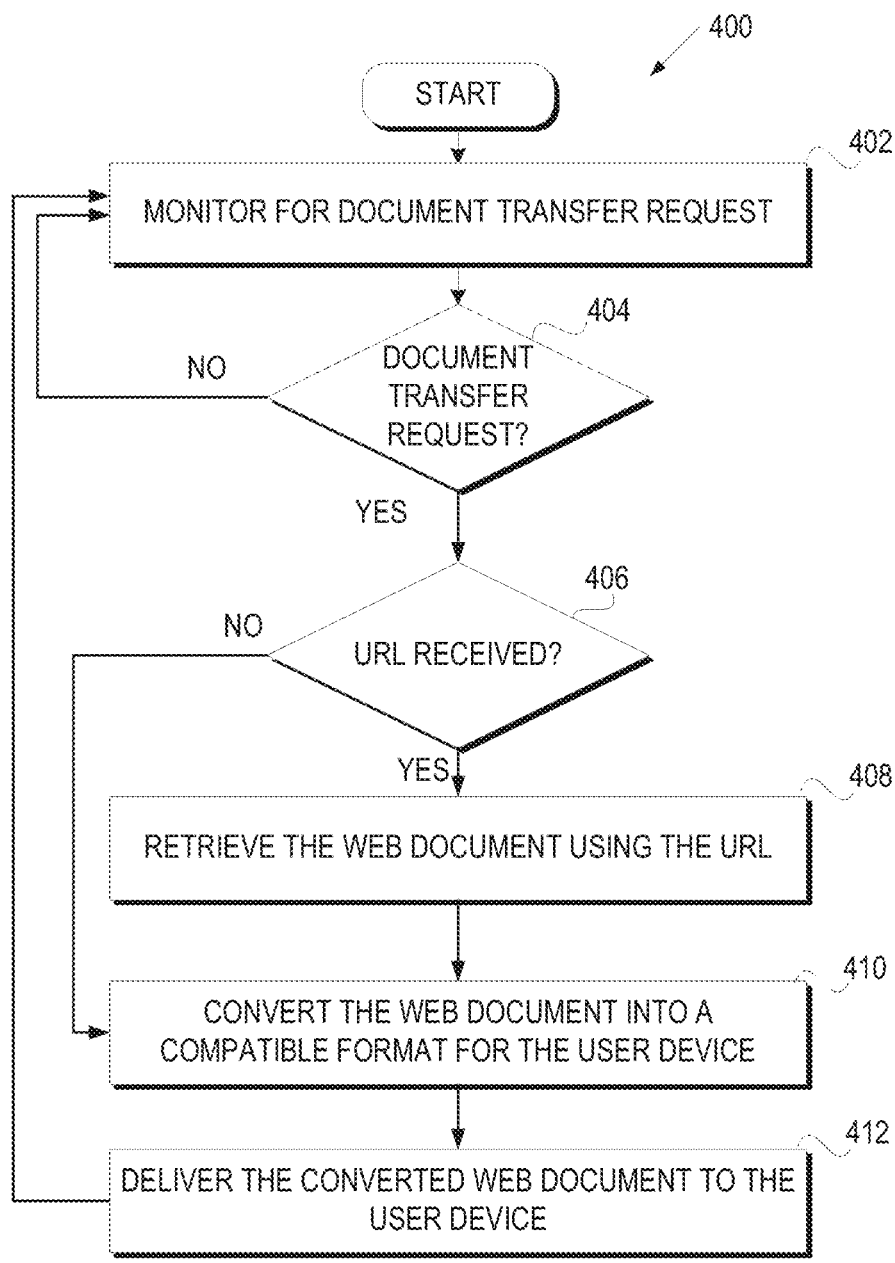
FIG. 4 is a flow diagram of one embodiment of a server-side method of document transfers to a user device.

FIG. 4 is a flow diagram of one embodiment of a server-side method of document transfers to a user device. In one embodiment, a server computing system performs the method 400. In another embodiment, the item providing system 120 of FIG. 1 performs the method 400. In another embodiment, the document transfer tool 122 of FIGS. 1 and 3 performs the method 400. Alternatively, other components of the network architecture 100 of FIG. 1 can perform some or all of the operations of method 400.

Referring to FIG. 4, method 400 starts by processing logic monitoring for document transfer requests (block 402). For example, a document transfer agent can be activated to initiate a document transfer request, and a document transfer tool can listen for incoming document transfer requests from the document transfer agent. The processing logic determines if a document transfer request is received (block 404). If no request is received at block 404, the processing logic returns to monitoring for document transfer requests at block 402. If a request is received at block 404, the processing logic determines if a URL is received in connection with the request (block 406). For example, the request may include the URL (or a URI), or the URL may be received shortly thereafter. If a URL is received at block 406, the processing logic retrieves the web document using the URL (block 408). The processing logic converts the web document into a compatible format for the user device (block 410) and sends the converted web document to the user device (block 412), such as over a wireless network, and returns to block 402 to continue to monitor for incoming document transfer requests. However, if there is no URL received at block 406, the processing logic receives the web document from the client computing system, and proceeds to block 410 to convert the web document into the compatible format for the user device.

In another embodiment of the method, the processing logic receives a request from a client computing system to transfer a web document to a user device for subsequent viewing on the user device. The processing logic converts a first format type of the web document into a second format type that is compatible with the user device, and sends the converted web document to the user device without additional user interaction at the client computing system. In one embodiment, the web document is formatted according to a first format type, and the processing logic converts the web document into a second format type. In one embodiment, the first format type is a web format type, such as HTML, and the second format type is a user device format, such as any one of the following formats: proprietary formats, open eBook package, portable document format (PDF), PostScript, DjVu, EPUB, FictionBook, the KINDLE® electronic book reader, eReader, Mobipocket, TealDoc, Broadband eBook, WOLF, Tome Raider, ArghosReader, Multimedia EBook, or Repligo. Alternatively, other format types may be used for the first and second format types as would be appreciated by one of ordinary skill in the art having the benefit of this disclosure.

In another embodiment, the processing logic receives the request from a document transfer agent installed agent installed in connection with a browser of the client computing system. In one embodiment, the document transfer agent is configured to transfer the web document that is currently open on the browser to the user device when activated. In another embodiment of the method, the processing logic determines if a user of the client computing system is authenticated with the server computing system. For example, the user may be logged into a service provided by the server computing system. If the user is not authenticated, the processing logic may prompt the user to authenticate with the server computing system. The authentication of the user may allow the server computing system to send the converted web document to the user device without additional user interaction at the client computing system. In another embodiment, the processing logic receives a request from the user to authenticate before receiving a document transfer request from the user. Alternatively, the processing logic can receive the authentication request concurrently, simultaneously, or subsequently to receiving the document transfer request. In one embodiment, the processing logic prompts the user for login information at the client computing system, and receives the login information input by the user from the client computing system. The processing logic verifies the login information to authenticate the user. In one embodiment, when the user is already authenticated, the processing logic automatically authorizes the conversion and delivery of the web document to the user device. The processing logic can ignore the request when the user is not authenticated.

In another embodiment of the method, the processing logic receives a user identifier to identify the user device, instead of the user's email address. Alternatively, other identifiers may be used to help the server computing system authenticate the user, identify the user device, or both. When using other identifiers, the processing logic can look up the email address of the user device using the identifier. Alternatively, the processing logic can lookup other information, such as the Media Access Control (MAC) address of the user device, the email address, the name of the device, or the like. This information may be stored in table that can be accessed by the processing logic to determine where to send the web document. In another embodiment, the request is generated in response to the user activating an element of a GUI of the browser. Alternatively, the request is generated in response to the user provide other types of inputs, such as a keyboard shortcut, or the like as would be appreciated by one of ordinary skill in the art having the benefit of this disclosure.

Figure 5:
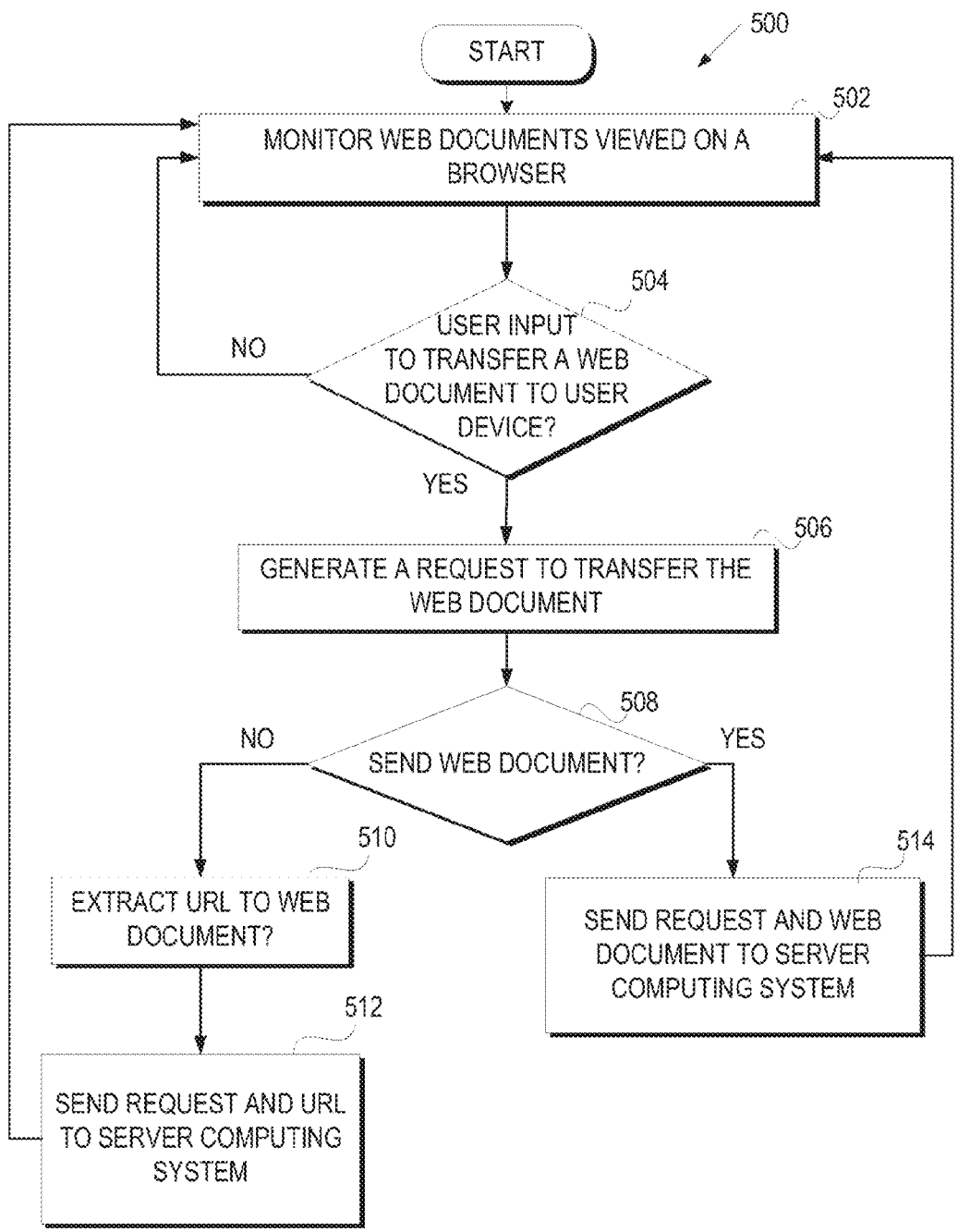
FIG. 5 is a flow diagram of one embodiment of a client-side method of document transfers to a user device.

FIG. 5 is a flow diagram of one embodiment of a client-side method of document transfers to a user device. In one embodiment, the client computing system 102 of FIG. 1 performs the method 500. In another embodiment, the document transfer tool of FIGS. 1 and 2 performs the method 500. Alternatively, other components of the network architecture 100 of FIG. 1 can perform some or all of the operations of method 500.

Referring to FIG. 5, method 500 starts by processing logic monitoring web documents viewed on a browser executing on a client computing system (block 502). The processing logic determines if user input is received to transfer a web document to the user device (block 504). If no user input is received, the processing logic returns to block 502 and continues to monitor. If user input is received at block 504, the processing logic generates a request to transfer the web document (block 506). Before sending the request, the processing logic determines if the processing logic should send the web document itself or a URL (or URI) corresponding to the web document (block 508). This may be a setting that is defined by the user or may be determined based on the size of the web document. If at block 508 the processing logic determines not to send the web document in connection with the request, the processing logic extracts the URL to the web document from the browser (block 510), and sends the request and URL to the server computing system hosting the document transfer tool as described above. If the processing logic determines to send the web document at block 508, the processing logic sends the request and the web document to the server computing system (block 514). In one embodiment, the processing logic compresses the web document before sending the web document to the server computing system. In which case, the server computing system decompresses the compressed document before converting and delivering the web document to the user device. After sending the request at block 512 or 514, the processing logic returns to block 502 to continue monitoring web documents viewed on the browser.

In another embodiment of the method, the processing logic authenticates a user of a browser with a server computing system (e.g., item providing system 120). While a web document is currently open in the browser, the processing logic receives user input from the user to transfer the currently open web document to a user device for subsequent viewing on the user device. The processing logic sends a request to the server computing system to transfer the web document to the user device. The transfer of the web document is performed without additional user interaction at the client computing system. In one embodiment, the processing logic authenticates the user by prompting the user for login information, receiving the login information from the user, and sending the login information to the server computing system to authenticate the user.

Figure 6:
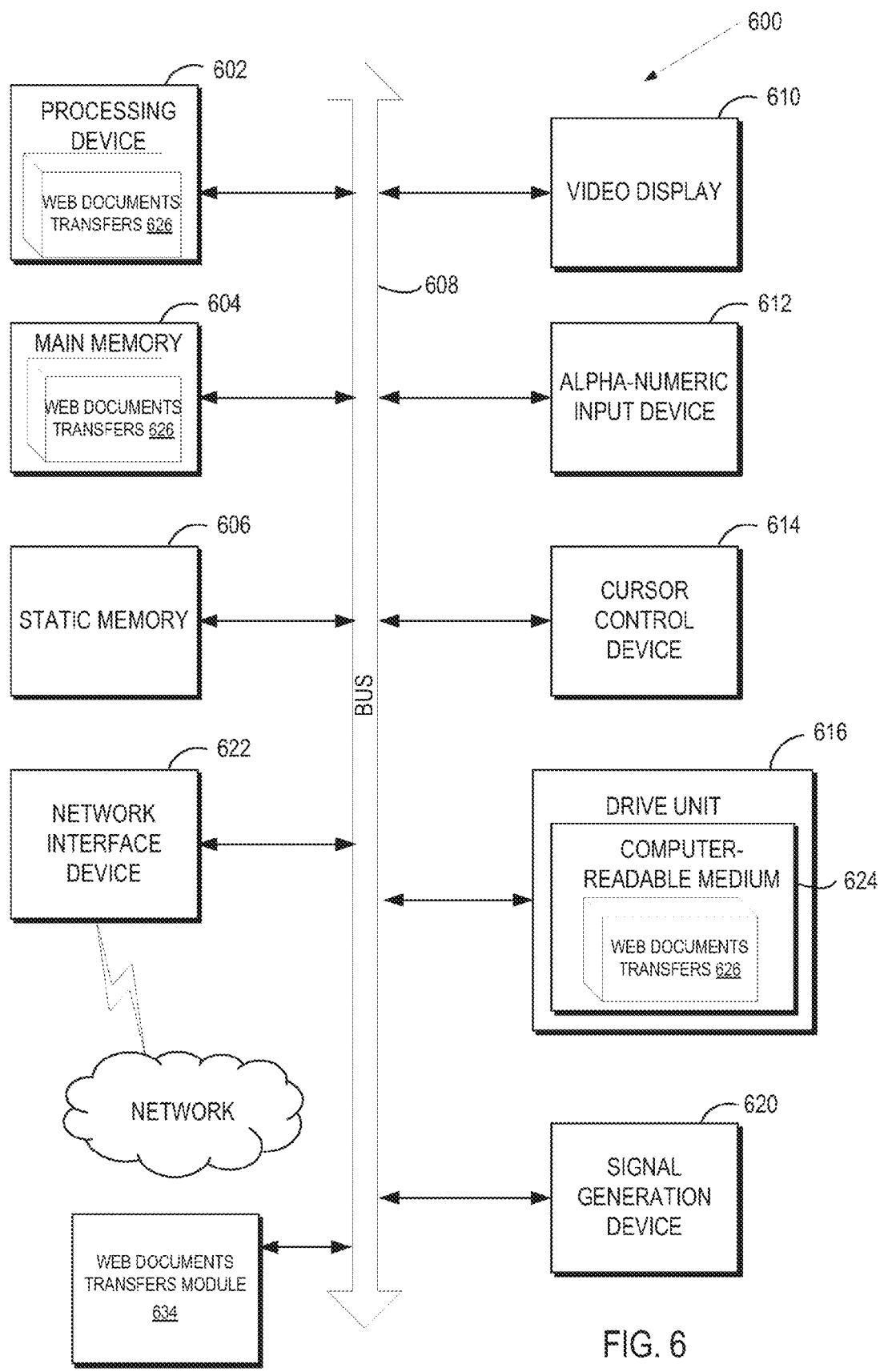
FIG. 6 illustrates a diagrammatic representation of a machine in the exemplary form of a computing system for web document transfers.

FIG. 6 illustrates a diagrammatic representation of a machine in the exemplary form of a computing system for web document transfers. Within the computing system 600 is a set of instructions for causing the machine to perform any one or more of the methodologies discussed herein. In alternative embodiments, the machine may be connected (e.g., networked) to other machines in a LAN, an intranet, an extranet, or the Internet. The machine may operate in the capacity of a server or a client machine in a client-server network environment, or as a peer machine in a peer-to-peer (or distributed) network environment. The machine may be a PC, a tablet PC, a set-top-box (STB), a personal data assistant (PDA), a cellular telephone, a web appliance, a server, a network router, switch or bridge, or any machine capable of executing a set of instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein for web document transfers, such as the method 400 described above. In one embodiment, the computing system 600 represents various components that may be implemented in any one of the devices described with respect to FIGS. 1-3 as described above. Alternatively, the devices may include more or less components as illustrated in the computing system 600.

The exemplary computing system 600 includes a processing device 602, a main memory 604 (e.g., read-only memory (ROM), flash memory, dynamic random access memory (DRAM) such as synchronous DRAM (SDRAM), etc.), a static memory 606 (e.g., flash memory, static random access memory (SRAM), etc.), and a data storage device 616, each of which communicate with each other via a bus 630.

Processing device 602 represents one or more general-purpose processing devices such as a microprocessor, central processing unit, or the like. More particularly, the processing device 602 may be a complex instruction set computing (CISC) microprocessor, reduced instruction set computing (RISC) microprocessor, very long instruction word (VLIW) microprocessor, or a processor implementing other instruction sets or processors implementing a combination of instruction sets. The processing device 602 may also be one or more special-purpose processing devices such as an application specific integrated circuit (ASIC), a field programmable gate array (FPGA), a digital signal processor (DSP), network processor, or the like. The processing device 602 is configured to execute the processing logic (e.g., web document transfers 526) for performing the operations and steps discussed herein.

The computing system 600 may further include a network interface device 622. The computing system 600 also may include a video display unit 610 (e.g., a liquid crystal display (LCD) or a cathode ray tube (CRT)), an alphanumeric input device 612 (e.g., a keyboard), a cursor control device 614 (e.g., a mouse), and a signal generation device 620 (e.g., a speaker).

The data storage device 616 may include a computer-readable storage medium 624 on which is stored one or more sets of instructions (e.g., web document transfers 626) embodying any one or more of the methodologies or functions described herein. The web document transfers 626 may also reside, completely or at least partially, within the main memory 604 and/or within the processing device 602 during execution thereof by the computing system 600, the main memory 604 and the processing device 602 also constituting computer-readable storage media. The web document transfers 626 may further be transmitted or received over a network via the network interface device 622.

While the computer-readable storage medium 624 is shown in an exemplary embodiment to be a single medium, the term "computer-readable storage medium" should be taken to include a single medium or multiple media (e.g., a centralized or distributed database, and/or associated caches and servers) that store the one or more sets of instructions. The term "computer-readable storage medium" shall also be taken to include any medium that is capable of storing a set of instructions for execution by the machine and that causes the machine to perform any one or more of the methodologies of the present embodiments. The term "computer-readable storage medium" shall accordingly be taken to include, but not be limited to, solid-state memories, optical media, magnetic media, or other types of mediums for storing the instructions. The term "computer-readable transmission medium" shall be taken to include any medium that is capable of transmitting a set of instructions for execution by the machine to cause the machine to perform any one or more of the methodologies of the present embodiments.

The web document transfers module 632, components, and other features described herein (for example in relation to FIGS. 1-3) can be implemented as discrete hardware components or integrated in the functionality of hardware components such as ASICS, FPGAs, DSPs, or similar devices. The web document transfers module 632 may implement operations of document transfer as described herein with respect to FIGS. 4-5. In addition, the web document transfers module 632 can be implemented as firmware or functional circuitry within hardware devices. Further, the web document transfers module 632 can be implemented in any combination hardware devices and software components.

Figure 7:
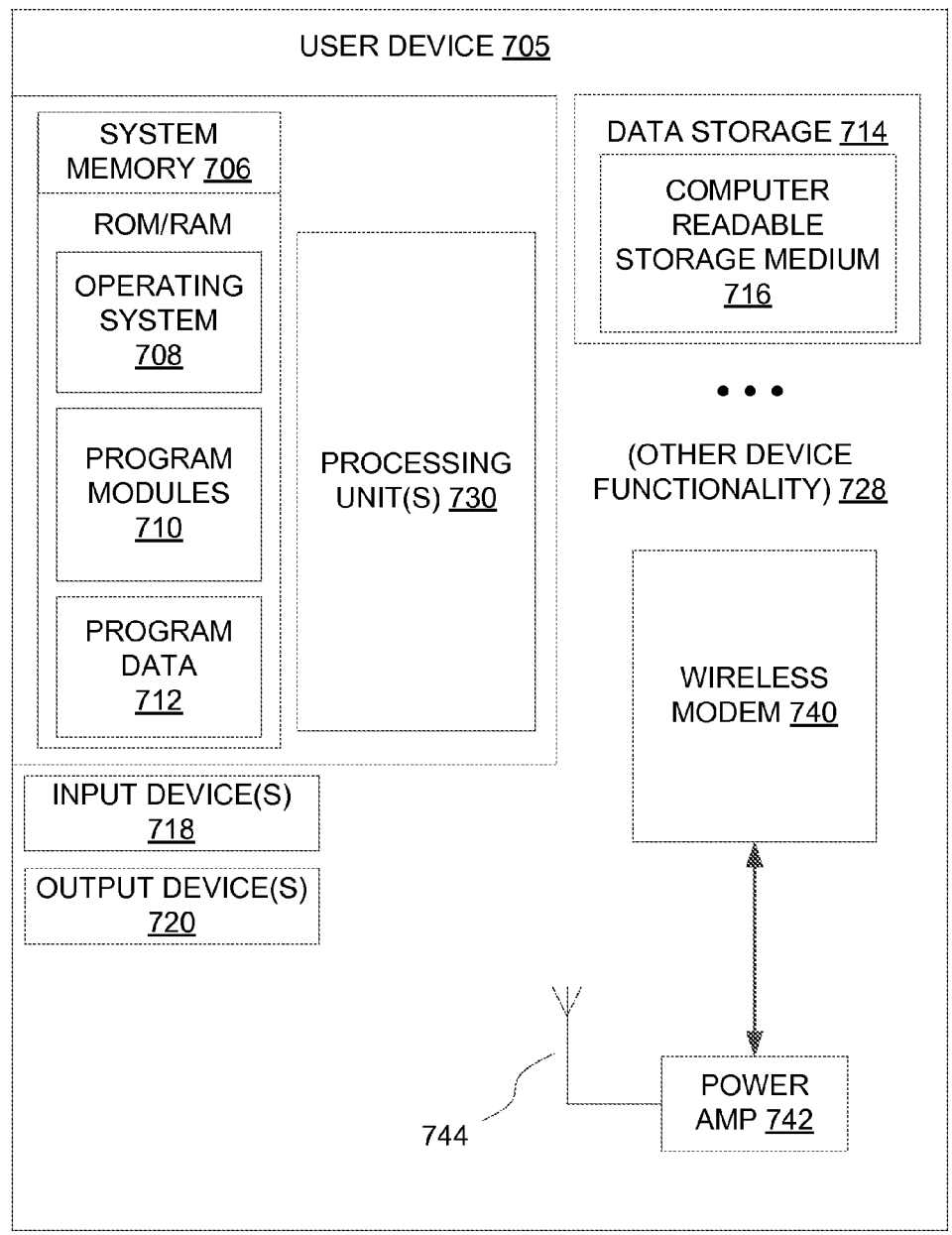
FIG. 7 is a block diagram illustrating an exemplary user device according to one embodiment.

FIG. 7 is a block diagram illustrating an exemplary user device 700 according to one embodiment. The user device 700 is one embodiment of the user device 104 described above. The user device 700 includes one or more processing devices 702, such as one or more CPUs, microcontrollers, field programmable gate arrays, or other types of processors. The user device 700 also includes system memory 706, which may correspond to any combination of volatile and/or non-volatile storage mechanisms. The system memory 706 stores information which provides an operating system component 708, program modules 710, program data 712, and/or other components. The user device 700 performs functions by using the processing units 730 to execute instructions provided by the system memory 706. In one embodiment, the user device 706 executes a set of instructions for causing the user device to perform any one or more of the methodologies discussed herein. For example, when the client computing system 102 is a user device, the user device may be configured to perform a client-side document transfer to another user device. The user device may be connected (e.g., networked) to other machines in a LAN, an intranet, an extranet, or the Internet. The user device 700 may operate in the capacity of a client machine in client-server network environment. The user device 700 may be any machine capable of executing a set of instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein.

The processing device 702 represents one or more general-purpose processing devices such as a microprocessor, central processing unit, or the like. More particularly, the processing device 702 may be a complex instruction set computing (CISC) microprocessor, reduced instruction set computing (RISC) microprocessor, very long instruction word (VLIW) microprocessor, or a processor implementing other instruction sets or processors implementing a combination of instruction sets. The processing device 702 may also be one or more special-purpose processing devices such as an application specific integrated circuit (ASIC), a field programmable gate array (FPGA), a digital signal processor (DSP), network processor, or the like.

The user device 700 may also include a data storage device 714 that may be composed of one or more types of removable storage and/or one or more types of non-removal storage (e.g., read-only memory (ROM), flash memory, dynamic random access memory (DRAM) such as synchronous DRAM (SDRAM), flash memory, static random access memory (SRAM)). The data storage device 714 may include a computer-readable medium 216 on which is stored one or more sets of instructions embodying any one or more of the methodologies or functions described herein, as well as various other instructions for operating the user device. These instructions may also reside, completely or at least partially, within the system memory 706 and/or within the processing unit(s) 730 during execution thereof by the user device 700, the system memory 706 and the processing unit(s) 730 also constituting computer-readable media. The instructions may further be transmitted or received over a network via a network interface device.

While the computer-readable storage medium 716 is shown in an exemplary embodiment to be a single medium, the term "computer-readable storage medium" should be taken to include a single medium or multiple media (e.g., a centralized or distributed database, and/or associated caches and servers) that store the one or more sets of instructions. The term "computer-readable storage medium" shall also be taken to include any medium that is capable of storing, encoding or carrying a set of instructions for execution by the machine and that cause the machine to perform any one or more of the methodologies of the present invention. The term "computer-readable storage medium" shall accordingly be taken to include, but not be limited to, solid-state memories, optical media, and magnetic media.

The user device 700 may also include one or more input devices 718 (keyboard, mouse device, specialized selection keys, etc.) and one or more output devices 720 (displays, printers, audio output mechanisms, etc.). The user device 700 may further include network interface devices, video displays (e.g., liquid crystal displays (LCDs) or a cathode ray tube (CRT)).

The user device 700 further includes a wireless modem 740 to allow the user device 700 to communicate via a wireless network (e.g., such as provided by the wireless communication system) with other computing devices, such as remote computers, the item providing system 120, and so forth. The wireless modem 740 allows the user device 700 to handle both voice and non-voice communications (such as communications for text messages, multimedia messages, media downloads, web browsing, etc.) with the wireless communication system 110. The wireless modem 740 may provide network connectivity using any type of mobile network technology including, for example, cellular digital packet data (CDPD), general packet radio service (GPRS), enhanced data rates for GSM evolution (EDGE), universal mobile telecommunications system (UMTS), 1 times radio transmission technology (1xRTT), evaluation data optimized (EVDO), high-speed downlink packet access (HSDPA), Wi-Fi, LTE, CDMA, WiMax, etc.

The wireless modem 740 may generate signals and send these signals to power amplifier (amp) 742 for amplification, after which they are wirelessly transmitted via antenna 744. Antenna 744 may be configured to transmit in different frequency bands and/or using different wireless communication protocols. The antenna 744 may be a directional, omnidirectional, or non-directional antenna. In addition to sending data, antenna 744 also receive data, which is sent to wireless modem 740 and transferred to processing units 730.

Though a single modem 740 is shown to control transmission by the antenna 744, the user device 700 may alternatively include multiple wireless modems, each of which is configured to transmit data via a different antenna and/or wireless transmission protocol. In one embodiment, each modem includes a transceiver or a transmitter and a receiver. The processing units 730 control the modem 740.

The above-enumerated list of modules is representative and is not exhaustive of the types of functions performed by the user device 700. As indicated by the label "Other Device Functionality" 728, the user device 700 may include additional functions.

In the above description, numerous details are set forth. It will be apparent, however, to one of ordinary skill in the art having the benefit of this disclosure, that embodiments of the present invention may be practiced without these specific details. In some instances, well-known structures and devices are shown in block diagram form, rather than in detail, in order to avoid obscuring the description.

Some portions of the detailed description are presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self-consistent sequence of steps leading to a desired result. The steps are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the above discussion, it is appreciated that throughout the description, discussions utilizing terms such as "detecting," "determining," "prompting," "generating," "communicating," "receiving," "disabling," or the like, refer to the actions and processes of a computer system, or similar electronic computing device, that manipulates and transforms data represented as physical (e.g., electronic) quantities within the computer system's registers and memories into other data similarly represented as physical quantities within the computer system memories or registers or other such information storage, transmission or display devices.

Embodiments of the present invention also relate to an apparatus for performing the operations herein. This apparatus may be specially constructed for the required purposes, or it may comprise a general purpose computer selectively activated or reconfigured by a computer program stored in the computer. Such a computer program may be stored in a computer readable storage medium, such as, but not limited to, any type of disk including floppy disks, optical disks, CD-ROMs, and magnetic-optical disks, read-only memories (ROMs), random access memories (RAMs), EPROMs, EEPROMs, magnetic or optical cards, or any type of media suitable for storing electronic instructions.

The algorithms and displays presented herein are not inherently related to any particular computer or other apparatus. Various general purpose systems may be used with programs in accordance with the teachings herein, or it may prove convenient to construct a more specialized apparatus to perform the required method steps. The required structure for a variety of these systems will appear from the description below. In addition, the present invention is not described with reference to any particular programming language. It will be appreciated that a variety of programming languages may be used to implement the teachings of the present invention as described herein. It should also be noted that the terms "when" or the phrase "in response to," as used herein, should be understood to indicate that there may be intervening time, intervening events, or both before the identified operation is performed.

It is to be understood that the above description is intended to be illustrative, and not restrictive. Many other embodiments will be apparent to those of skill in the art upon reading and understanding the above description. The scope of the present invention should, therefore, be determined with reference to the appended claims, along with the full scope of equivalents to which such claims are entitled.

What is claimed is:

1. A method, implemented by a client computing system programmed to perform the following, the method comprising:
while presenting a webpage in a browser of the client computing system, receiving user input indicating selection of a graphical user interface (GUI) element displayed in connection with the browser;
based at least in part on receiving the selection of the GUI element, initiating a transfer of digital content of the webpage to a user device for subsequent consumption by the user device, wherein the user device is a different device than the client computing system;
sending an unauthenticated request to transfer the digital content of the webpage presented in the browser;
prompting a user of the browser to login to an account in response to the unauthenticated request, wherein the unauthenticated request comprises information to identify the account, which identifies the user device to which the digital content is to be transferred when the GUI element is selected and the user is logged into the account;
sending an authentication request with login information to authenticate the user to automatically authorize operations to transfer the digital content; and sending an authenticated transfer request to a server computing system to transfer the digital content presented in the browser to the user device for the subsequent consumption by the user device, and wherein the transfer of the digital content to the user device is performed by the server computing system without additional user interaction at the client computing system after sending the authenticated transfer request.

2. The method of claim 1, further comprising:
redirecting the browser to a login webpage to authenticate the user, and
returning the browser to the webpage being presented before the prompting.

3. The method of claim 1, wherein the authenticated transfer request comprises a uniform resource locator (URL) of the webpage, wherein the server computing system retrieves the digital content from the URL for transferring the digital content to the user device.

4. The method of claim 1, further comprising sending the digital content to the server computing system in connection with the authenticated transfer request.

5. The method of claim 1, further comprising:
compressing the digital content into compressed digital content; and
sending the compressed digital content to the server computing system in connection with the authenticated transfer request.

6. The method of claim 1, wherein the digital content is digital content of a web document presented in the browser.

7. The method of claim 6, wherein the user device is an electronic book reader.

8. A non-transitory computer readable storage medium including instructions that, when executed by a processing device of a client computing system, cause the processing device to perform operations comprising:
while presenting a webpage in a browser of the client computing system, receiving user input indicating selection of a graphical user interface (GUI) element displayed in connection with the browser;
based at least in part on receiving selection of the GUI element, initiating a transfer of digital content of the webpage to a user device for subsequent consumption by the user device, wherein the user device is a different device than the client computing system;
sending an unauthenticated request to transfer the digital content of the webpage presented in the browser;
prompting a user of the browser to login to an account in response to the unauthenticated request, wherein the unauthenticated request comprises information to identify the account, which identifies the user device to which the digital content is to be transferred when the GUI element is selected and the user is logged into the account;
sending an authentication request with login information to authenticate the user to automatically authorize operations to transfer the digital content; and
sending an authenticated transfer request to a server computing system to transfer the digital content presented in the browser to the user device for the subsequent consumption by the user device, and wherein the transfer of the digital content to the user device is performed by the server computing system without additional user interaction at the client computing system after sending the authenticated transfer request.

9. The non-transitory computer readable storage medium of claim 8, wherein the operations further comprise:
redirecting the browser to a login webpage to authenticate the user, and
returning the browser to the webpage being presented before the prompting.

10. The non-transitory computer readable storage medium of claim 8, wherein the authenticated transfer request comprises a uniform resource locator (URL) of the webpage, wherein the server computing system retrieves the digital content from the URL for transferring the digital content to the user device.

11. The non-transitory computer readable storage medium of claim 8, wherein the operations further comprise sending the digital content to the server computing system in connection with the authenticated transfer request.

12. The non-transitory computer readable storage medium of claim 8, wherein the operations further comprise:
compressing the digital content into compressed digital content; and
sending the compressed digital content to the server computing system in connection with the authenticated transfer request.

13. The non-transitory computer readable storage medium of claim 8, wherein the digital content is digital content of a web document presented in the browser.

14. The non-transitory computer readable storage medium of claim 8, wherein the user device is an electronic book reader.

15. A client computing system comprising:
a network interface device;
a memory device to store instructions of a browser; and
a processing device coupled to the memory device and the network interface device, wherein the processing device is operable to:
receive user input, indicating selection of a graphical user interface (GUI) element displayed in connection with the browser, while presenting a webpage in the browser;
initiate a transfer of digital content of the webpage to a user device for subsequent consumption by the user device based at least in part on receiving the selection of the GUI element, wherein the user device is a different device than the client computing system;
send an unauthenticated request to transfer the digital content of the webpage presented in the browser;
prompt a user of the browser to login to an account in response to the unauthenticated request, wherein the unauthenticated request comprises information to identify the account, which identifies the user device to which the digital content is to be transferred when the GUI element is selected and the user is logged into the account;
send an authentication request with login information to authenticate the user to automatically authorize operations to transfer the digital content; and
send an authenticated transfer request to a server computing system to transfer the digital content presented in the browser to the user device for the subsequent consumption by the user device, and wherein the transfer of the digital content to the user device is performed by the server computing system without additional user interaction at the client computing system after sending the authenticated transfer request.

16. The client computing system of claim 15, wherein the processing device is further operable to:
redirect the browser to a login webpage to authenticate the user, and return the browser to the webpage being presented before prompting the use of the browser to login to the account.

17. The client computing system of claim 15, wherein the authenticated transfer request comprises a uniform resource locator (URL) of the webpage, wherein the server computing system retrieves the digital content from the URL for transferring the digital content to the user device.

18. The client computing system of claim 15, wherein the processing device is further operable to send the digital content to the server computing system in connection with the authenticated transfer request.

19. The client computing system of claim 15, wherein the processing device is further operable to:
   compress the digital content into compressed digital content; and
   send the compressed digital content to the server computing system in connection with the authenticated transfer request.

20. The client computing system of claim 15, wherein the digital content is digital content of a web document presented in the browser, and wherein the user device is an electronic book reader.

* * * * *